(12) United States Patent
Shi et al.

(10) Patent No.: US 9,383,565 B2
(45) Date of Patent: Jul. 5, 2016

(54) TUBE SHIELD LENS UNIT

(71) Applicant: Carl Zeiss Microscopy GmbH, Jena (DE)

(72) Inventors: Renhu Shi, Gottingen (DE); Matthias Gonschor, Gleichen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 14/455,646

(22) Filed: Aug. 8, 2014

(65) Prior Publication Data
US 2015/0043064 A1    Feb. 12, 2015

(30) Foreign Application Priority Data

Oct. 8, 2013  (DE) .......................... 10 2013 220 266
Apr. 12, 2014  (DE) .......................... 10 2014 005 501

(51) Int. Cl.
*G02B 21/02* (2006.01)
*G02B 9/14* (2006.01)
*G02B 27/00* (2006.01)

(52) U.S. Cl.
CPC  *G02B 21/02* (2013.01); *G02B 9/14* (2013.01); *G02B 27/0025* (2013.01); *G02B 27/0062* (2013.01)

(58) Field of Classification Search
CPC ...... G02B 21/02; G02B 9/14; G02B 27/0062; G02B 27/0025
USPC .......................... 359/368, 379–381, 656–661
See application file for complete search history.

(56) References Cited

U.S. PATENT DOCUMENTS 2,713,808 A     7/1955  Walter
4,365,871 A *  12/1982  Muchel .......................... 359/656
(Continued)

FOREIGN PATENT DOCUMENTS

EP      2202556        6/2010
JP      09090231 A *   4/1997    ............. G02B 21/06
(Continued)

OTHER PUBLICATIONS

European Search Report for EP Application No. 14178849 dated Feb. 2, 2015. English translation not provided.
Achromatic Lens, Wikipedia. Dated May 15, 2013. http://en.wikipedia.org/wiki/Achromatic_lens.

*Primary Examiner* — Frank Font
(74) *Attorney, Agent, or Firm* — Patterson Thuente Pedersen, P.A.

(57) ABSTRACT

A tube lens unit for microscopes with achromatically corrective effect for the use with objectives that image an object to infinity and that have achromatic residual errors. The tube lens unit includes of at least two lenses with the properties:

$n_P < 1.50$ and $v_P < 71$ $n_N < 1.66$ and $v_N < 37$, wherein $n_P$ and $n_N$ signify the refractive index ($n_e$) at a wavelength of 546 nm for a positive and negative lens respectively, and $v_P$ and $v_N$ signify the Abbe number ($v_e$) at a wavelength of 546 nm for a positive and negative lens respectively, and the beam paths are characterized by the conditions:

$|\delta A| < 0.60$ and $|\delta B| < 0.30$, wherein $\delta A$ signifies the variation of the aperture ray and $\delta B$ signifies the variation of the main ray while passing through the surfaces of the lenses.

6 Claims, 5 Drawing Sheets

(56) References Cited

U.S. PATENT DOCUMENTS

| | | | |
|---|---|---|---|
| 6,133,576 A * | 10/2000 | Shafer et al. | 250/461.1 |
| 7,289,271 B2 * | 10/2007 | Muchel | 359/661 |
| 2006/0256451 A1 * | 11/2006 | Schaack | 359/741 |
| 2007/0047094 A1 * | 3/2007 | Winterot et al. | 359/663 |
| 2009/0284841 A1 * | 11/2009 | Shi et al. | 359/656 |
| 2010/0172029 A1 | 7/2010 | Nakayama | |

FOREIGN PATENT DOCUMENTS

| | | |
|---|---|---|
| JP | 2012194354 | 10/2012 |
| WO | WO 2005/088378 | 9/2005 |

* cited by examiner

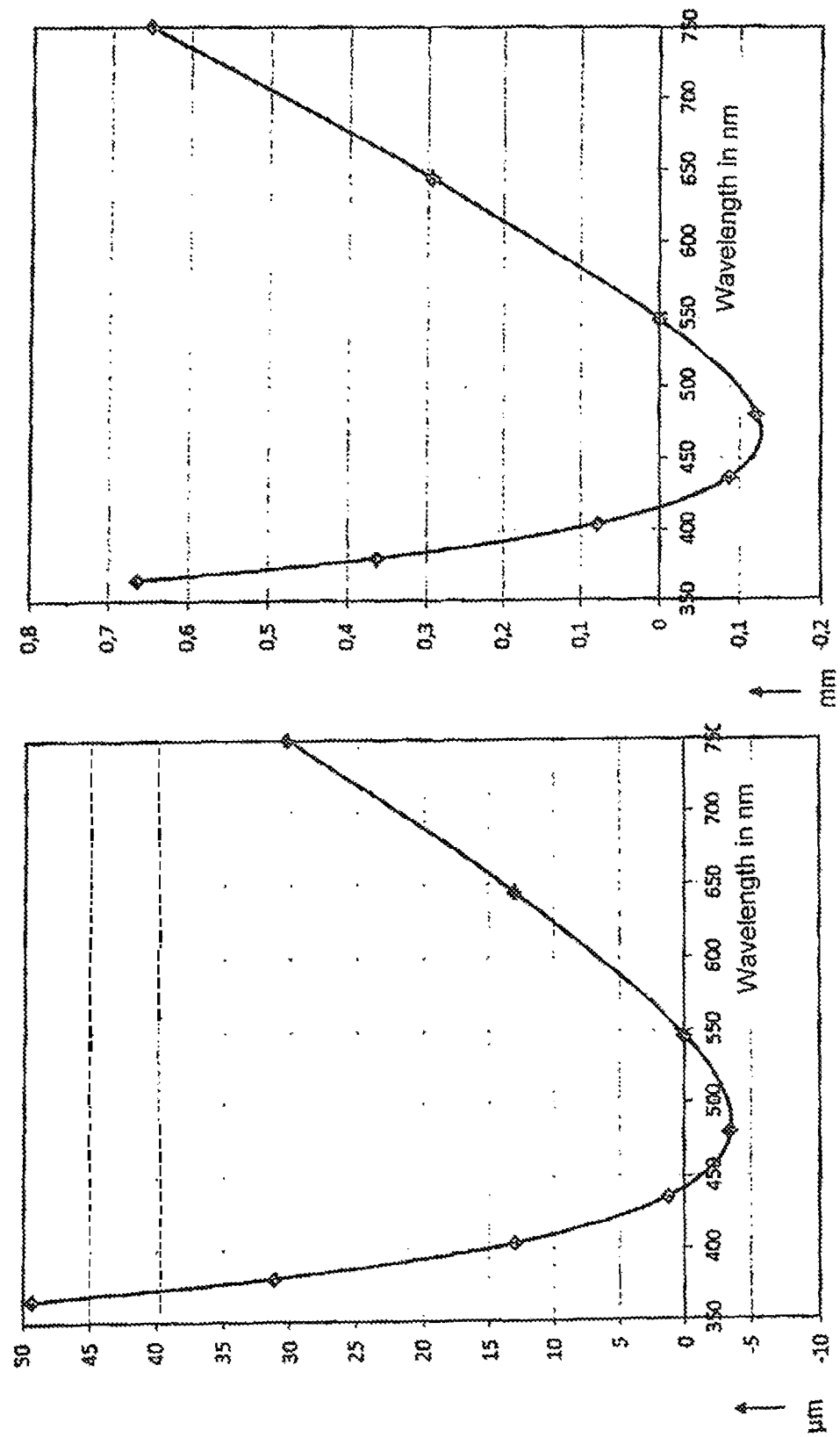

TUBE SHIELD LENS UNIT

RELATED APPLICATIONS

This application claims the benefit of German National Patent Application No. 102013220266.0, filed on Aug. 10, 2013, and 102014005501.9, filed on Apr. 12, 2014, said applications being hereby fully incorporated herein by reference.

FIELD OF THE INVENTION

The invention relates to a tube lens unit br microscopes with achromatically corrective effect for the use with objectives that image an object at infinity and that have achromatic residual errors.

So-called ICS systems (infinity color-free correction s stems) are known which consist of an objective with residual chromatic errors and that image an object at infinity and a tube lens unit with chromatically compensating effect.

With such a system, it is possible, despite the chromatic residual errors of the objective, to form an intermediate image without chromatic aberrations, and to obtain, to the greatest possible extent, a true-to-color rendition of microscopic object details throughout the entire image field.

BACKGROUND OF THE INVENTION

A significant disadvantage of the known ICS systems is the fact that the distance between the objective and the tube lens unit is only variable within narrow limits, and therefore these systems are tied to predetermined tube lens units and thus can only be used in instruments for which they were designed.

In WO2005/088378, a tube lens unit is described which achieves a chromatically compensating effect when used with objectives that focus an image at infinity and that have residual chromatic errors. However, the space between the microscope objective and the tube lenses where light rays are parallel is not corrected because the chromatic errors of the objective are compensated. It has proven disadvantageous that the space between the microscope objective and the tube lens is not variable. In addition, a lateral offset between objective and the tube lens unit generates a lateral chromatic aberration on the optical axis.

A corrected tube lens unit is further described in US 2010172029. In order to eliminate the chromatic aberration as much as possible, cost-intensive lenses with abnormal dispersion must be used. This solution is disadvantageous because, depending on the space between the objective and the tube lens, the variation of the astigmatism is not sufficiently reduced. Furthermore, there is less than desirable compensation of the lateral chromatic aberrations from the objective and the tube lens unit.

SUMMARY OF THE INVENTION

Proceeding from the disadvantages of the solutions of the prior art, the invention addresses the problem of improving a tube lens unit with regard to compactness and robustness, wherein compactness is characterized by a short structural length, and robustness defines the minimizing of the changes of aberrations in case of Abbe errors and lateral offset of the lenses and the height variation of the aperture and main beam while passing through the tube lens unit.

The aperture ray is a ray which extends from the axial object point at a peripheral edge of the object to the edge of the lens aperture, while the main ray is the ray which extends from the highest field point and passes through the center of the entrance pupil.

According to embodiments of the invention, this problem is solved with a tube lens unit including, at least two lenses with the properties $n_P < 1.50$ and $v_P < 71$ $n_N < 1.66$ and $v_N < 37$, wherein $n_P$ and $n_N$ signify the refractive index at a wavelength of 546 nm for a positive and negative lens respectively, and $v_P$ and $v_N$ signify the Abbe number at a wavelength of 546 nm for a positive and negative lens respectively, and the beam paths are characterized by the conditions $|\delta A| < 0.60$ and $|\delta B| < 0.30$, wherein $\delta A$ signifies the variation of the aperture ray—penetration heights for a diameter of the entrance pupil of 17.55 mm while passing through the surfaces of the lenses, and $\delta B$ signifies the variation of the main ray—penetration heights for an incidence angle w=3.23 degrees while passing through the surfaces of the lenses.

Advantageously, the tube lens unit consists of a cemented element with two lenses which, proceeding from the infinite space, is characterized by a meniscus lens with negative refractive power and a biconvex lens with positive refractive power.

With an entrance pupil on a first surface, a diameter of the entrance pupil of 17.55 mm, the position of the object surface in infinity, a focal length of 195.03 mm, and a field number of 22, this variation is preferably characterized by the following functional data:

| Surface F1-F5 | Radius r1-r5 | Thickness d1-d4 | $n_e$ | $v_e$ |
|---|---|---|---|---|
| 1 | Plane | 180.0 | | |
| 2 | 110.5964 | 5.870 | 1.624 | 36.1 |
| 3 | 59.1367 | 13.300 | 1.489 | 70.2 |
| 4 | −269.954 | 185.0 | | |
| 5 | Plane | | | | wherein r is the radius in mm, d is the thickness of the lenses or the distance in air in mm, $n_e$ denotes the refractive index, and $v_e$ signifies the Abbe number.

In a further advantageous embodiment, the tube lens unit, proceeding from the infinite space, consists of a biconvex lens (L1) with positive refractive power, and a cemented element, comprising a meniscus lens (L2) with negative refractive power and a meniscus lens (L3) with positive refractive power, wherein the radii of curvature of all surfaces of the meniscus lenses (L2, L3) are on the imaging side.

In a first embodiment, with an entrance pupil on a first surface, a diameter of the entrance pupil of 17.55 mm, the position of the object surface in infinity, a focal length of 195.02 mm, and a field number of 22, this variation is preferably characterized by the following functional data:

| Surface F1-F7 | Radius r1-r7 | Thickness d1-d6 | $n_e$ | $v_e$ |
|---|---|---|---|---|
| 1 | Plane | 180.0 | | |
| 2 | 244.082 | 4.100 | 1.489 | 70.2 |
| 3 | −230.574 | 0.504 | | |
| 4 | 95.7844 | 2.580 | 1.652 | 33.6 |
| 5 | 58.2937 | 4.800 | 1.489 | 70.2 |

-continued

| Surface F1-F7 | Radius r1-r7 | Thickness d1-d6 | $n_e$ | $v_e$ |
|---|---|---|---|---|
| 6 | 153.9989 | 185.0 | | |
| 7 | Plane | | | | and in a second embodiment, with an entrance pupil on a first surface, a diameter of the entrance pupil of 17.55 mm, the position of the object surface in infinity, a focal length of 195.00 mm, and a field number of 22, this variation is preferably characterized by the following functional data:

| Surface F1-F7 | Radius r1-r7 | Thickness d1-d6 | $n_e$ | $v_e$ |
|---|---|---|---|---|
| 1 | Plane | 180.0 | | |
| 2 | 286.521 | 4.200 | 1.500 | 66.8 |
| 3 | −196.674 | 0.600 | | |
| 4 | 85.3597 | 3.980 | 1.652 | 33.6 |
| 5 | 52.7051 | 4.630 | 1.489 | 70.2 |
| 6 | 122.325 | 182.4 | | |
| 7 | Plane | | | | wherein r is the radius in mm, d is the thickness of the lenses or the distance in air in mm, $n_e$ denotes the refractive index, and $v_e$ signifies the Abbe number.

With achromasia in the classical sense for spectral lines C'=643.85 nm and F'=479.99 nm, the lateral chromatic aberration cannot be fully compensated with objectives. The change of emphasis of achromasia from C'-F' to d-h is due to the increasing use of cameras in microscopy. Achromasia at C'-F' indicates that the focus positions at the spectral line C' (643.85 nm) and F' (479.99 nm) are identical while achromasia at d-h indicates that the focus positions at the spectral line d=587.56 nm and h=404.65 nm are identical. C', F', d, and h are specific spectral lines from the emitter, thus specific wavelengths.

As a rule, CCD sensors have a broader range of spectral sensitivity. Infrared beams are filtered out by means of IR block filters. In the range of the short wavelengths, CCD sensors are usually more spectrally sensitive than the human eye. The tube lens unit realizes an achromasia for the spectral line d=587.56 nm and h=404.65 nm, and therefore, the chromatic errors, together with objectives, can be fully compensated in the entire visual range (VIS).

The imaging errors, such as spherical aberration, coma, astigmatism, and field curvature are largely corrected for a diameter of the entrance pupil of 17.55 mm, and can therefore be termed a "diffraction-limited correction." With the variation of the infinite space of ±35 mm in front of the tube lens unit, there is little change of the astigmatism and the chromatic error.

BRIEF DESCRIPTION OF THE DRAWINGS

In the following, the tube lens unit according to the invention shall be further explained in detail using two embodiments.

FIGS. 4a & 4b show depictions of the lateral chromatic aberrations and longitudinal chromatic aberrations according to the embodiment of FIG. 1 (first variation);

DETAILED DESCRIPTION

Figure 1A:
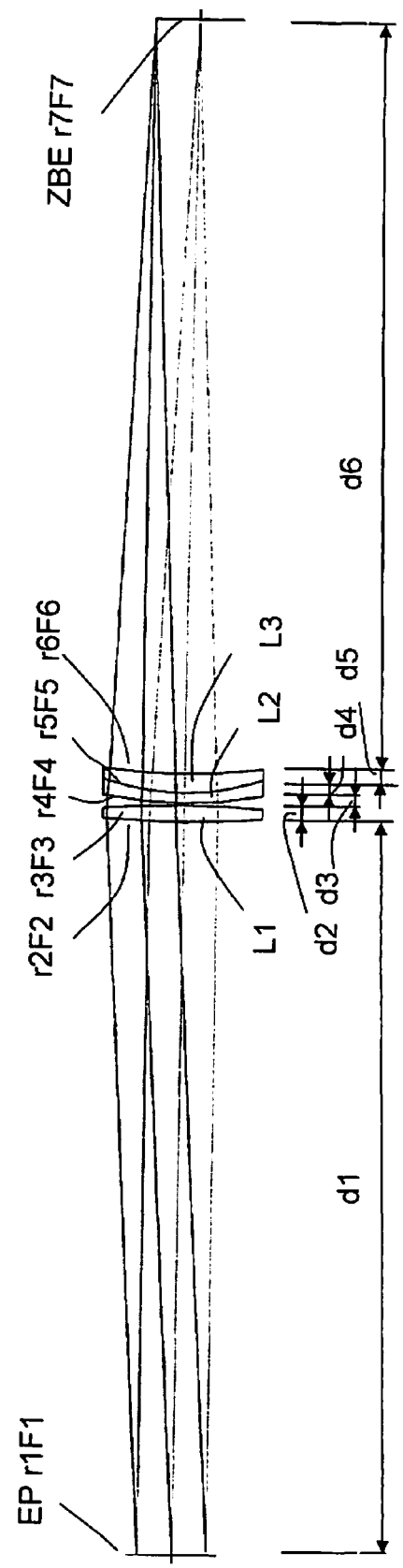
FIG. 1a shows a depiction of the tube lens unit with three lenses in a first variation.
Figure 1B:
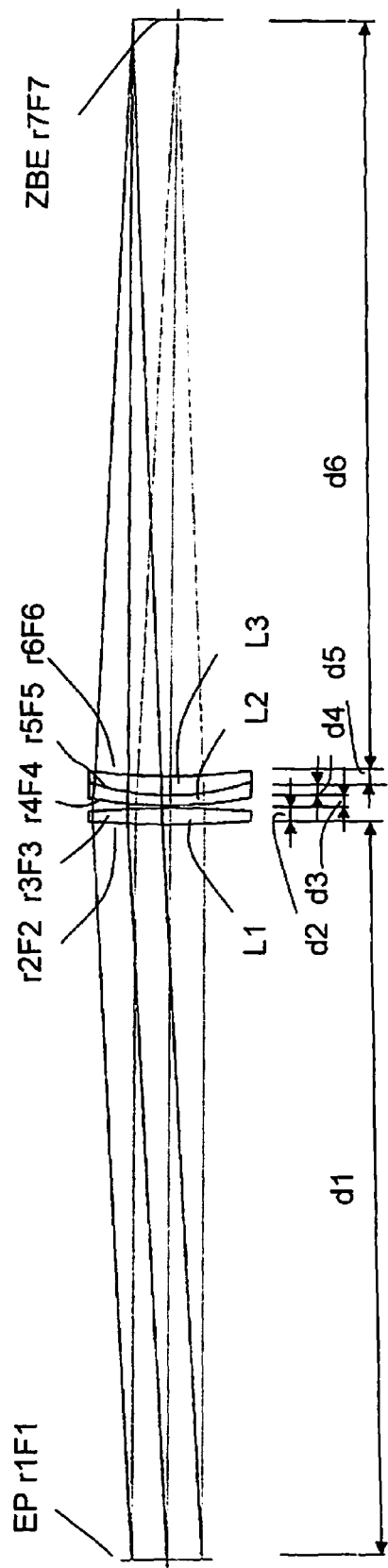
FIG. 1b shows a depiction of the tube lens unit with three lenses in a second variation.

In a first embodiment, FIGS. 1a and 1b show the tube lens unit according to the invention with a biconvex single lens L1 and a cemented element, including a meniscus lens L2 with negative refractive power and a meniscus lens L3 with positive refractive power. FIGS. 1a and 1b further show the radii r1 to r6, the surfaces F1, F2, F3, F4, F5, F6, F7, the thicknesses d2, d4, d5 of the lenses L1, L2, L3, the distance in air d1 between the entrance pupil EP and the lens L1, the distance in air d3 between lens L1 and L2 and the distance in air d6 between lens L3 and the intermediate image plane ZBE. The centers of curvature r4, r5, r6 of all surfaces F4, F5, F6 of the lenses L2 and L3 are on the imaging side.

In a first variation depicted in FIG. 1a, this embodiment of the tube lens unit, with an entrance pupil EP on the surface F1, a diameter of the entrance pupil EP of 17.55 mm, the position of the object surface in infinity, a focal length f' of 195.02 mm, and a field number of 22, is characterized by the following functional data:

| Surface F1-F7 | Radius r1-r7 | Thickness d1-d6 | $n_e$ | $v_e$ |
|---|---|---|---|---|
| 1 | Plane | 180.0 | | |
| 2 | 244.082 | 4.100 | 1.489 | 70.2 |
| 3 | −230.574 | 0.504 | | |
| 4 | 95.7844 | 2.580 | 1.652 | 33.6 |
| 5 | 58.2937 | 4.800 | 1.489 | 70.2 |
| 6 | 153.9989 | 185.0 | | |
| 7 | Plane | | | | and with an entrance pupil on a first surface, a diameter of the entrance pupil of 17.55 mm, the position of the object surface in infinity, a focal length of 195.00 mm, and a field number of 22, a second variation depicted in FIG. 1b is preferably characterized by the following functional data:

| Surface F1-F7 | Radius r1-r7 | Thickness d1-d6 | $n_e$ | $v_e$ |
|---|---|---|---|---|
| 1 | Plane | 180.0 | | |
| 2 | 286.521 | 4.200 | 1.500 | 66.8 |
| 3 | −196.674 | 0.600 | | |
| 4 | 85.3597 | 3.980 | 1.652 | 33.6 |
| 5 | 52.7051 | 4.630 | 1.489 | 70.2 |
| 6 | 122.325 | 182.4 | | |
| 7 | Plane | | | | wherein r1 to r7 are the radii in mm, d1 to d6 are the thicknesses or the distances in air in mm, $n_e$ denotes the refractive index, and $v_e$ signifies the Abbe number.

Figure 2:
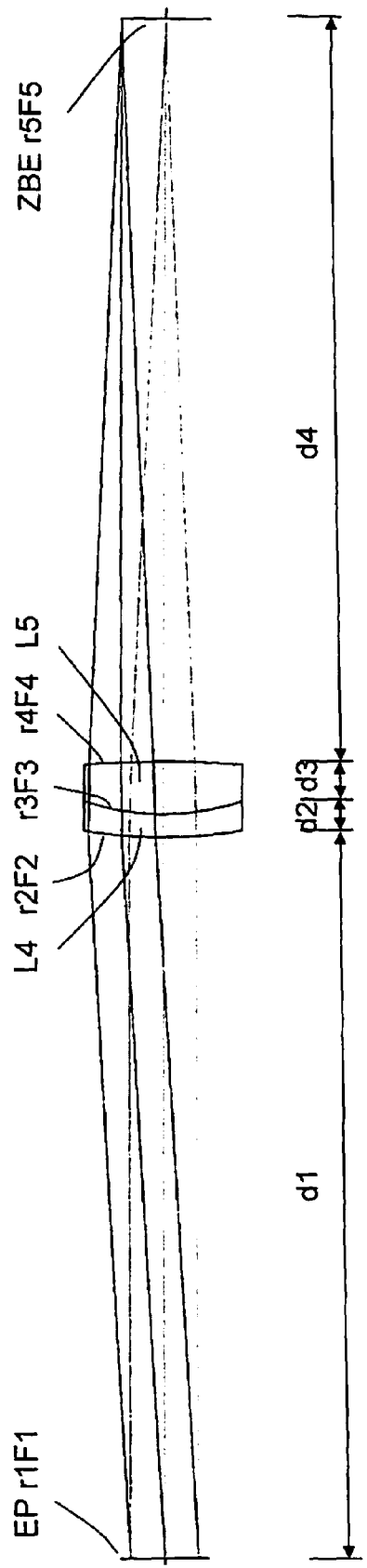
FIG. 2 shows a depiction of the tube lens unit with two lenses.

In a second embodiment, FIG. 2 shows the tube lens unit according to the invention with a cemented element consisting of two lenses L4, L5, wherein, proceeding from the infinite space, the lens L4 is designed as a meniscus lens and the lens L5 is designed as a biconvex lens with negative refractive power. FIG. 2 further shows the radii r1 to r5, the thicknesses d2, d3 of the lenses L4, L5, the surfaces F1, F2, F3, F4, F5, the distance in air d1 between the entrance pupil EP and the lens L4, and the distance in air d4 between lens L5 and the intermediate image plane ZBE.

This embodiment, with an entrance pupil EP on a first surface 1, a diameter of the entrance pupil EP of 17.55 mm, the position of the object surface in infinity, a focal length f of 195.03 mm, and a field number of 22, is characterized by the following functional data:

| Surface F1-F5 | Radius r1-r5 | Thickness d1-d4 | $n_e$ | $v_e$ |
|---|---|---|---|---|
| 1 | Plane | 180.0 | | |
| 2 | 110.5964 | 5.870 | 1.624 | 36.1 |
| 3 | 59.1367 | 13.300 | 1.489 | 70.2 |
| 4 | −269.954 | 185.0 | | |
| 5 | Plane | | | | wherein r1 to r5 are the radii in mm, d1 to d4 are the thicknesses or the distances in air in mm, $n_e$ denotes the refractive index, and $v_e$ signifies the Abbe number.

Figure 3:
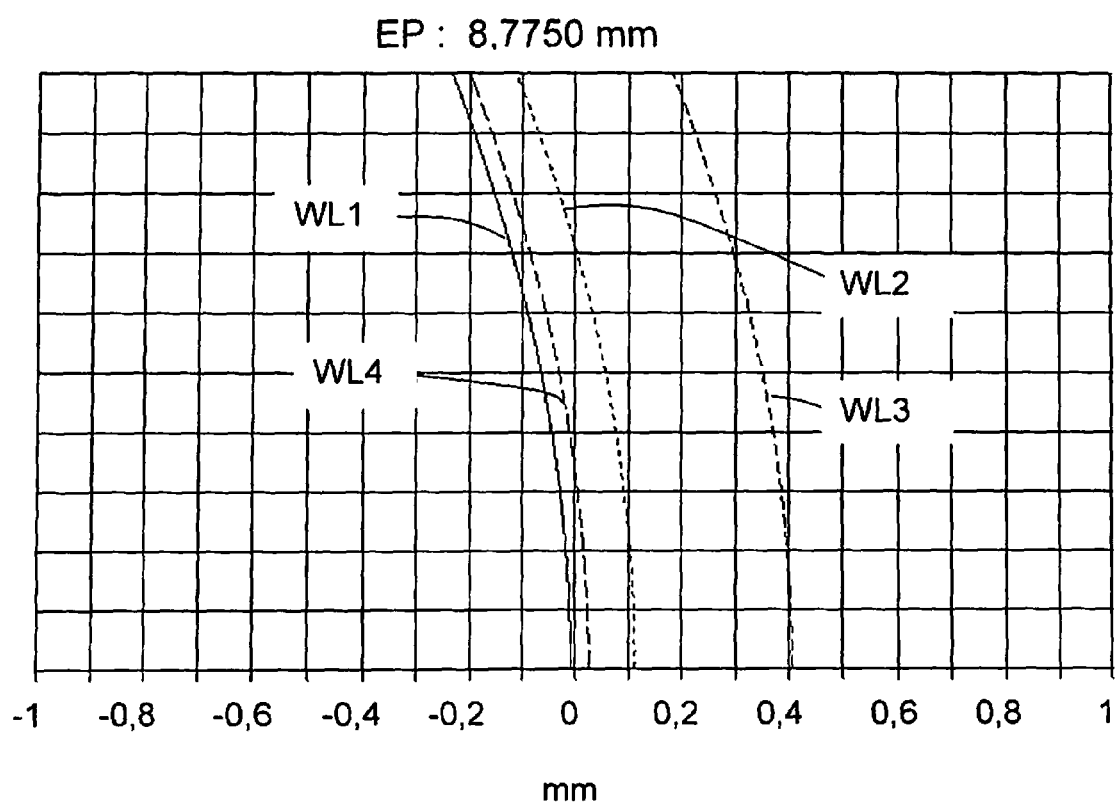
FIG. 3 shows a depiction of the longitudinal aberrations on the basis of the entrance pupil according to the embodiment of FIG. 1 (first variation)

FIG. 3 shows longitudinal aberrations of the tube lens unit according to the first embodiment (FIG. 1, first variation) on the basis of the entrance pupil EP. The maximum radius of the entrance pupil EP is 8.7750 mm. The longitudinal aberrations are shown for the wavelengths WL1=0.480 μm, WL2=0.546 μm, WL3=0.644 μm, and WL4=0.436 μm, wherein one increment in the vertical coordinate equals 0.8775 mm.

From the behavior of the curves, it can be determined that spherical aberrations are almost entirely corrected. It is further apparent that an achromasia is generated, even though, in the classical sense, not determined for the wavelengths WL1 and WL2.

FIGS. 4a-4b show lateral chromatic aberrations for an image height of +11 mm (FIG. 4a) and longitudinal chromatic aberrations at a diameter of the entrance pupil of 17.55 mm (FIG. 4b) on the basis of different wavelengths in nm according to the first embodiment (FIG. 1, first variation). The focus positions for the wavelengths h (404.65 nm) and d (587.56 nm) are almost identical (FIG. 4b), i.e. an achromasia is realized for the wavelengths h and d.

Figure 5A:
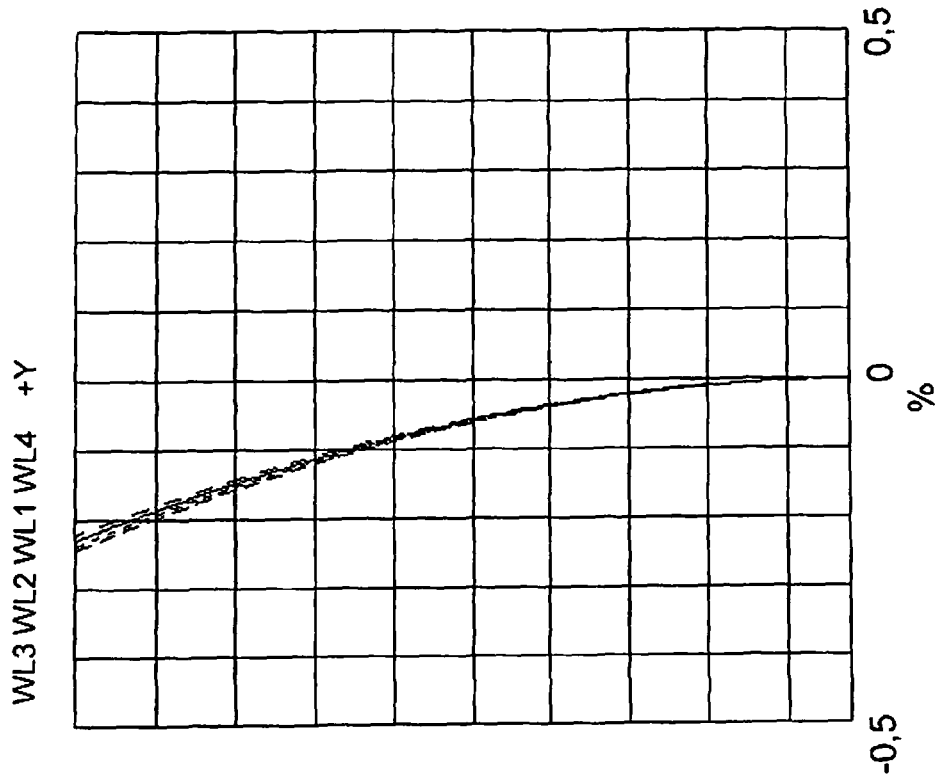
FIGS. 5a & 5b show depiction of the field-dependent imaging errors for astigmatism and distortion according to the embodiment of FIG. 1 (first variation).
Figure 5B:
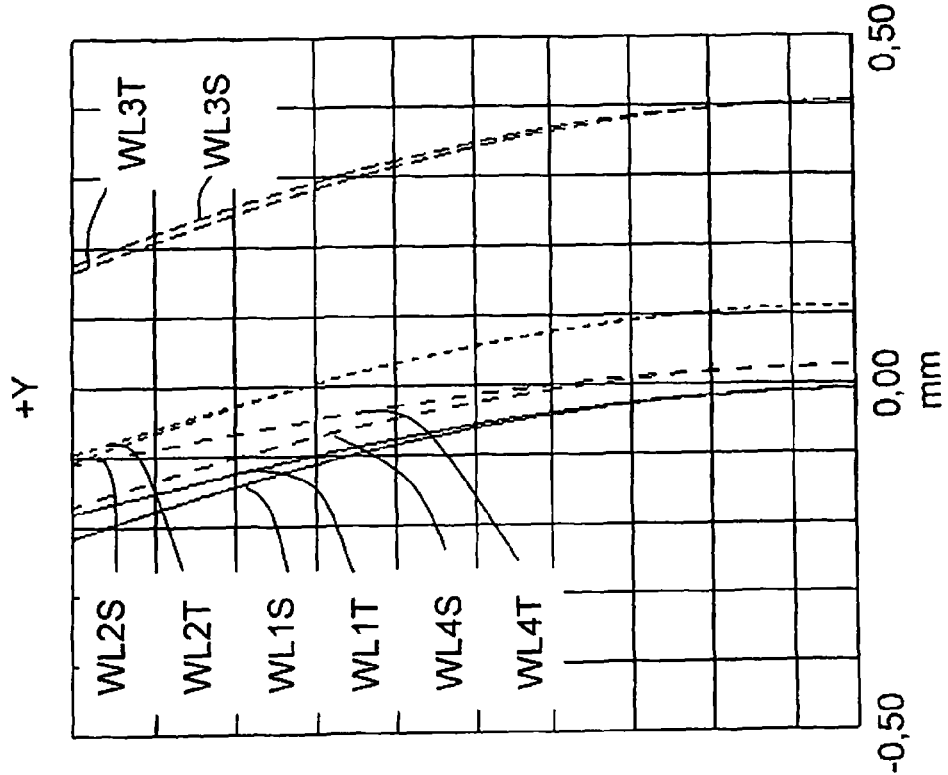

FIGS. 5a-5b show field-dependent imaging errors for the astigmatism (FIG. 5a) and the distortion (FIG. 5b) at four different wavelengths WL1=0.480 μm, WL2=0.546 μm, WL3=0.644 μm, and WL4=0.436 μm on the basis of the image height Y (maximum of 11 mm) according to the first embodiment (FIG. 1, first variation), wherein S defines the sagittal image surface and T the tangential image surface.

For the entrance pupil EP with a diameter of 17.55 mm, the depth of field in the image space is 0.27 mm. The distance at the edge of the field between the sagittal image surface S and the tangential image surface T (FIG. 5a) is less than 0.05 mm for all indicated wavelengths, i.e. it is approximately one sixth of the depth of field. Thus, the astigmatism is almost entirely corrected. On the edge of the field, the distortion (FIG. 5b) is −0.24% and can thus be corrected with the objectives.

The invention claimed is:

1. A tube lens unit for a microscope, the tube lens unit having an achromatically corrective effect and the tube lens being for the use with objectives image an object to infinity and that have achromatic residual errors, the tube lens unit including at least two lenses including a positive lens and a negative lens with the properties $n_P < 1.50$ and $v_P < 71$ $n_N < 1.66$ and $v_N < 37$, wherein $n_P$ and $n_N$ signify the refractive index $n_e$ at a wavelength of 546 nm for the positive and the negative lens respectively, and $v_P$ and $v_N$ signify the Abbe number $v_e$ at a wavelength of 546 nm for the positive and the negative lens respectively, and ray paths are characterized by conditions as follows:

$|\delta A| < 0.60$ and $|\delta B| < 0.30$, wherein δA signifies the variation of an aperture ray as penetration heights for a diameter of the entrance pupil EP of 17.55 mm while passing through surfaces of the two lenses and δB signifies variation of a main ray as penetration heights for an incidence angle w=3.23 degrees while passing through the surfaces of the two lenses.

2. The tube lens unit according to claim 1, wherein the positive lens and the negative lens comprise a cemented element which, proceeding from space where light rays are parallel, the negative lens comprises a meniscus lens with negative refractive power and the positive lens comprises a biconvex lens with positive refractive power.

3. The tube lens unit according to claim 1 which, proceeding from space where light rays are parallel, includes the positive lens comprising a biconvex lens, and the negative lens comprising a cemented element comprising a meniscus lens with negative refractive power and a meniscus lens with positive refractive power, and wherein the centers of the radii of curvature of all surfaces of the meniscus lens with negative refractive power and a meniscus lens with positive refractive power are on the imaging side.

4. The tube lens unit according to claim 1, having an entrance pupil located at a first surface, a diameter of the entrance pupil being 17.55 mm, the position of the object surface being at infinity, a focal length (f) of 195.03 mm, and a field number of 22, which is characterized by the following functional data:

| Surface F1-F5 | Radius r1-r5 | Thickness d1-d4 | $n_e$ | $v_e$ |
|---|---|---|---|---|
| 1 | Plane | 180.0 | | |
| 2 | 110.5964 | 5.870 | 1.624 | 36.1 |
| 3 | 59.1367 | 13.300 | 1.489 | 70.2 |
| 4 | −269.954 | 185.0 | | |
| 5 | Plane | | | | wherein r is the radius in mm, d is the thickness of the lenses or the distance in air in mm,
$n_e$ denotes the refractive index, and $v_e$ signifies the Abbe number.

5. The tube lens unit according to claim 1 having an entrance pupil located at a first surface, a diameter of the entrance pupil being 17.55 mm, the position of the object surface at infinity, a focal length of 195.02 mm, and a field number of 22, which is characterized by the following functional data:

| Surface F1-F7 | Radius r1-r7 | Thickness d1-d6 | $n_e$ | $v_e$ |
|---|---|---|---|---|
| 1 | plane | 180.0 | | |
| 2 | 244.082 | 4.100 | 1.489 | 70.2 |
| 3 | −230.574 | 0.504 | | |
| 4 | 95.7844 | 2.580 | 1.652 | 33.6 |
| 5 | 58.2937 | 4.800 | 1.489 | 70.2 |
| 6 | 153.9989 | 185.0 | | |
| 7 | plane | | | | wherein r is the radius in mm, d is the thickness of the lenses r the distances in air in mm, $n_e$ denotes the refractive index, and $v_e$ signifies the Abbe number.

6. The tube lens unit according to claim 1 having an entrance pupil located at a first surface, a diameter of the entrance pupil being 7.55 mm, the position of the object surface being at infinity, a focal length (f') of 195.00 mm, and a field number of 22, which is characterized by the following, functional data:

| Surface F1-F7 | Radius r1-r7 | Thickness d1-d6 | $n_e$ | $v_e$ |
|---|---|---|---|---|
| 1 | Plane | 180.0 | | |
| 2 | 286.521 | 4.200 | 1.500 | 66.8 |
| 3 | −196.674 | 0.600 | | |
| 4 | 85.3597 | 3.980 | 1.652 | 33.6 |
| 5 | 52.7051 | 4.630 | 1.489 | 70.2 |
| 6 | 122.325 | 182.4 | | |
| 7 | Plane | | | | wherein r is the radius in mm, d is the thickness of the lenses or the distances in air in mm, $n_e$ denotes the refractive index, and $v_e$ signifies the Abbe number.

* * * * *